(12) United States Patent
Sato

(10) Patent No.: US 7,106,959 B2
(45) Date of Patent: Sep. 12, 2006

(54) CAMERA AND WATERPROOF CAMERA CASING

(75) Inventor: Atsushi Sato, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 106 days.

(21) Appl. No.: 10/931,072

(22) Filed: Sep. 1, 2004

(65) Prior Publication Data

US 2005/0094024 A1    May 5, 2005

(30) Foreign Application Priority Data

Sep. 18, 2003   (JP) ............................. 2003-325569

(51) Int. Cl.
*G03B 17/08* (2006.01)
*G03B 17/04* (2006.01)

(52) U.S. Cl. .................... 396/27; 396/349; 348/373

(58) Field of Classification Search ............ 396/25–29, 396/349; 348/373–376, 81
See application file for complete search history.

(56) References Cited

U.S. PATENT DOCUMENTS

| 4,945,368 | A |   | 7/1990  | Ishino et al. ............. 396/177 |
| 5,111,222 | A | * | 5/1992  | Hayakawa et al. .......... 396/26 |
| 5,669,020 | A | * | 9/1997  | Hopmeyer ................ 396/27 |
| 5,682,563 | A |   | 10/1997 | Shinohara et al. .......... 396/287 |
| 5,956,187 | A |   | 9/1999  | Shintani .................. 359/696 |
| 6,825,881 | B1| * | 11/2004 | Fujii ..................... 348/335 |
| 2002/0039488 | A1 | * | 4/2002 | Sasaki et al. ............. 396/30 |
| 2003/0095798 | A1 | * | 5/2003 | Sakamoto ................. 396/85 |

FOREIGN PATENT DOCUMENTS

JP   2779625   5/1998

* cited by examiner

*Primary Examiner*—W. B. Perkey
*Assistant Examiner*—Rishi Suthar
(74) *Attorney, Agent, or Firm*—Oblon, Spivak, McClelland, Maier & Neustadt, P.C.

(57) ABSTRACT

A camera includes an outer cover; a lens barrel which is housed inside the outer cover in the state that a front face of the lens barrel is substantially in flush with a front face portion of the outer cover surrounding the front face of the lens barrel, whereas when the lens barrel is in a photographing-waiting state in which photographing is possible, the front face of the lens barrel is projected from said surrounding front face portion of the outer cover; a lens barrel state selector for selecting either one of setting the lens barrel in the housed state and keeping the lens barrel at a position in the photographing-waiting state, when a power supply of the camera is turned off; and a controller for controlling the camera such that the lens barrel is set in the housed state when the power supply of the camera is turned off in the state that the lens barrel state selector is selecting setting the lens barrel in the housed state, whereas the lens barrel is kept at the position in the photographing-waiting state when the power supply of the camera is turned off in the state that the selector is selecting keeping the lens barrel at the position in the photograph-waiting state.

8 Claims, 6 Drawing Sheets

CAMERA AND WATERPROOF CAMERA CASING

BACKGROUND OF THE INVENTION

Field of the Invention

The present invention relates to a camera and a waterproof camera casing. Particularly, the invention relates to a compact camera which is portable while being placed in handy a bag or a pocket and which can save a power cell required for driving its lens barrel. The invention also relates to a waterproof camera casing for such a camera.

As provided in conventional compact cameras, there is a so-called collapsable type camera in which a lens barrel holding a photographic lens unit therein can be housed in a camera body. When the camera is to be used to take a photograph, the lens barrel is projected (extended) from the camera body and the projected state is maintained. When the camera is to be carried after the photographing, the lens barrel is housed in the camera body again for improving convenience.

In case of such a conventional camera, a main trend in such a system is that the lens barrel is automatically projected to a photographing-waiting position out of the camera body when the power supply of the camera is turned on, whereas the lens barrel is automatically collapsed into the camera body when the power supply of the camera is turned off. In such a collapsable type compact camera, only a state in which the power of the camera is turned on and the lens barrel is projected from the camera body is the photographing-waiting state. That is, photographing cannot be optically performed in the state that the lens barrel is housed into the camera body. Even if the power of the camera is merely turned on, photographing cannot be performed in this state.

On the other hand, in some conventional cameras, a detachable waterproof casing is provided for a camera body so as to enable photographing in water and/or improve waterproof and dust-repelling property.

For such a waterproof camera to improve gas-tightness against the exterior, means for enhancing adhesion of the waterproof casing to the waterproof casing around a joining portion and an operational member as well as means for enabling various switches arranged at the camera body to be externally operated from the waterproof casing have been investigated (for example, Japanese patent No. 2779625).

A waterproof lens cover is also proposed, which realizes waterproofing and drip proofing by covering a zoom lens barrel that is moved to-and-fro with respect to the camera body. See Japanese Utility Model Registration No. 2537561. According to this waterproof zoom lens camera, since the waterproof lens cover is fitted to the camera body while the advancing/retracting photographing lens barrel is covered with such a waterproof lens cover, the entire volume inside a sealed space defined by the waterproof lens cover and the camera body does not change even when the photographing lens moves to-and-fro. Thus, the photographing lens barrel can be freely moved to-and-fro.

In the conventional cameras recited in connection with the prior techniques, as mentioned above, the lens barrel is extended outwardly to a photographing-enabling state to (photographing-waiting state) from the camera body by turning on the power supply for the camera. To the contrary, the lens barrel is housed into the camera body by turning off the power supply of the camera so that the camera may be in a state that the lens barrel is housed in the camera body to allow it to be suitably portable, although it cannot perform photographing. However, since much power is consumed in driving the lens barrel unit, that is, in moving the lens barrel from the housed position to the photographing-waiting position and vice versa, there are problems in that the consuming speed of the power cell and thus the number of times of exchanging the power cells increase, so that maintenance cost rises and the number of frames capable of being photographed decreases per power cell.

Further, it takes too much time to project the lens barrel to the photographing-waiting position for placing it in the photographing-enabling state, from the power-off state (lens barrel-housed state) by turning on the power. This does not meet a user's intension and may lose shutter chance depending upon cases.

In order to solve the above problems, if the lens barrel is kept projected from the camera body in such a state that the photographing can be always made, the power supply for the camera is always kept on. Consequently, there are problems in that the consuming speed of the cell and thus the number of times of exchanging the power cells increase, so that maintenance cost rises and the number of frames capable of being photographed decreases per cell.

The above problems become more conspicuous when a waterproof casing is fitted to the camera body. That is, the waterproof camera casing is preferably configured in such a form that the casing allows the camera to effect photographing in any mode in the state that the waterproof casing is attached to the camera. Therefore, as disclosed in Japanese Utility Model Registration No. 2537561, when the waterproof camera casing is used in such a camera that allows the lens barrel to move to-and-fro with respect to the camera body and within the water-proof casing, the lens barrel needs not to be collapsed in the housed position for convenience in carrying the camera. That is, there is an improvement needed in that it is not only meaningless to house the lens barrel every time in turning off the power supply of the camera but also such causes wasteful consumption of the power cell.

In order to keep the conventional camera ready to immediately take a photograph, the lens barrel needs to be always kept projected out of the camera body to the photographing-waiting position. For this purpose, the camera body needs to be always kept on. As a result, there are problems in that the consuming speed of the power cell and thus the number of times of exchanging the power cells increase, so that maintenance cost rises and the number of frames capable of being photographed decreases per power cell.

SUMMARY OF THE INVENTION

The present invention has been accomplished in view of the conventional problems as mentioned above, and is aimed at providing a camera which improves convenience in carrying the camera while the lens barrel is housed in the camera body and which can maintain the photograph-waiting position even if the power supply is turned off, in a case that the lens barrel needs not to be housed into the camera body, whereby the time period required to shift the camera lens from the photograph-waiting state to the photograph-enabling state is reduced and also the consumption power can be reduced as much as possible.

When the waterproof casing is used in a rainy, sandy or dusty environment, it is meaningless to house the lens barrel into the camera body within the waterproof casing. Thus, the present invention provides a camera which has consumption power reduced and improved convenience without housing the lens barrel into the camera body even if the power supply is turned off.

It is a further object of the present invention to provide a waterproof casing for a camera, which casing enables at least a part of a photographing function of the camera to be manipulated from outer side of the casing in the state that the camera is fitted in the casing so that the above noted convenience may be obtained.

It is a still further object of the present invention to provide a waterproof casing for a camera, which casing allows a lens barrel to not be housed into a camera body in cooperation with the camera, even if the power supply for the camera is turned off.

In order to solve the above problem, the camera according to the present invention comprises an outer cover; a lens barrel provided such that when the barrel is in a housed state, the lens barrel is housed inside the outer cover in the state that a front face of the lens barrel is substantially in flush with a front face portion of the outer cover surrounding the front face of the lens barrel, whereas when the lens barrel is in a photographing-waiting state in which photographing is possible, the front face of the lens barrel is projected from said surrounding front face portion of the outer cover; a lens barrel state selector for selecting either one of setting the lens barrel in the housed state and keeping the lens barrel at a position in the photographing-waiting state, when a power supply of the camera is turned off; and a controller for controlling the camera such that the lens barrel is set in the housed state when the power supply of the camera is turned off in the state that the lens barrel state selector is selecting setting the lens barrel in the housed state, whereas the lens barrel is kept at the position in the photographing-waiting state when the power supply of the camera is turned off in the state that the selector is selecting keeping the lens barrel at the position in the photograph-waiting state.

According to this construction, if the selector selects the state of keeping the lens barrel at the position in the photograph-waiting, the lens barrel is kept projected from the camera body and at the position in the photographing-waiting state when the power supply of the camera is turned off. Consequently, a photographer will not miss a shutter chance, and the number of times of exchanging power cells can be decreased by reducing consumption of the cell for the camera. In addition, if the lens barrel state selector selects setting the lens barrel in the housed state, the lens barrel can be housed into the outer casing when the power supply of the camera is turned off. Thus, the present invention can provide a camera which is convenient to be carried.

(1) The camera further comprises a lens barrel driving unit being configured for driving the lens barrel from the position in the photographing-waiting state to the housed state upon receipt of an order signal from the controller when the power supply of the camera is turned off in the state that said lens barrel state selector is selecting setting the lens barrel in the housed state, whereas the lens barrel driving unit drives the lens barrel from the housed state to the position in the photographing-waiting state upon receipt of an order signal from the controller when the power supply of the camera is turned on in the state that said lens barrel state selector is selecting setting the lens barrel in the housed state.

(2) The camera further comprises a waterproof camera casing detector configured to detect if a waterproof camera casing is attached to the camera, wherein in a case that the detector detects that the camera casing is attached to the camera, the controller controls the camera such that the lens barrel is kept at the position in the photographing-waiting state even when the power supply of the camera is turned off.

By so constructing the camera, in a case that the camera casing is attached to the camera, the lens barrel can be automatically kept at the position in the photographing-waiting state even when the power supply of the camera is turned off. Accordingly, a photographer will not miss a shutter chance owing to the automatic control, and the number of times of exchanging power cells can be decreased by reducing the power consumption of the cell for the camera.

According to another aspect of the present invention, a camera comprises an outer cover; a lens barrel provided such that when the barrel is in a housed state, the lens barrel is housed inside the outer cover in the state that a front face of the lens barrel is substantially in flush with a front face portion of the outer cover surrounding the front face of the lens barrel, whereas when the lens barrel is in a photographing-waiting state in which photographing is possible, the front face of the lens barrel is projected from said surrounding front face portion of the outer cover; a waterproof camera casing detector configured to detect if a waterproof camera casing is attached to the camera; and a controller being configured to control the camera such that in case that the detector detects that the camera casing is attached to the camera, the lens barrel is kept at the position in the photographing-waiting state even when the power supply of the camera is turned off.

By so constructing, in a case that the camera casing is attached to the camera, the lens barrel can be automatically kept at the position in the photographing-waiting state even when the power supply of the camera is turned off. Accordingly, a photographer will not miss a shutter chance owing to the automatic control, and the number of times of exchanging power cells can be decreased by reducing consumption of the cell for the camera.

According to a further aspect of the present invention, there is provided a waterproof camera casing configured to detachably house the camera according to the present invention, which camera casing comprises a selector configured to perform said selection of the lens barrel state by operation from an outer side of the waterproof casing.

By so constructing the camera, even when the waterproof camera casing is attached to the camera of the present invention, the lens barrel state selector can be operated. Consequently, the waterproof camera casing can be provided, which can utilize the above-mentioned effects of the invention camera even when the waterproof camera casing is attached to the camera.

According to a still further aspect of the present invention, there is provided a waterproof camera casing configured to detachably house the camera of the present invention, which casing comprises a detector being configured to make said waterproof camera casing attachment detector of the camera detect that the camera casing is attached to the camera when the camera is housed in the camera casing.

By so constructing the camera, the waterproof camera casing attachment detector of the camera is made to automatically detect that the waterproof camera casing is attached to the camera, so that when the power supply of the camera is turned off, the lens barrel can be kept at the position in the photographing-waiting position. Thus, even when the waterproof camera casing is attached to the camera, the effects exhibited by the camera according to the present invention can be exhibited.

As explained above, according to the camera of the present invention in which when the barrel is in the housed state, the front face of the lens barrel is substantially in flush with the front face portion of the outer cover surrounding the front face of the lens barrel, whereas when the lens barrel is in a photographing-waiting state in which photographing is possible, the front face of the lens barrel is projected from said surrounding front face portion of the outer cover, either one of setting the lens barrel in the housed state and keeping the lens barrel at a position in the photographing-waiting state when a power supply of the camera is turned off can be selected. In addition, control is effected such that in case that the lens barrel state selector is selecting setting the lens barrel in the housed state, the lens barrel is set in the housed state when the power supply of the camera is turned off, whereas in case that the selector is selecting keeping the lens barrel at the position in the photograph-waiting state, the lens barrel is kept at the position in the photographing-waiting, when the power supply of the camera is turned off. If the selector selects the states keeping the lens barrel at the position in the photograph-waiting, the lens barrel is kept projected from the camera body and at the position in the photographing-waiting state even when the power supply of the camera is turned off. Consequently, the photographer will not miss a shutter chance, and the number of times of exchanging power cells can be decreased by reducing consumption of the cell for the camera. In addition, if the lens barrel state selector selects setting the lens barrel in the housed state, the lens barrel can be housed into the outer casing when the power supply of the camera is turned off. Thus, the present invention can provide a camera having enhanced portability.

According to the first preferred embodiment of the camera of the present invention which comprises the outer cover and a lens barrel provided such that the lens barrel is housed inside the outer cover in the state that the front face of the lens barrel is substantially flush with the front face portion of the outer cover surrounding the front face of the lens barrel, whereas when the lens barrel is in a photographing-waiting state in which photographing is possible, the front face of the lens barrel is projected from said surrounding front face portion of the outer cover, whether the waterproof camera casing is attached to the camera or not can be detected. If it is detected that a waterproof camera casing is attached to the camera, the camera is controlled such that the lens barrel is kept at the position in the photographing-waiting state when the power supply of the camera is turned off. Thus, when the camera casing is attached to the camera, the lens barrel can be automatically kept at the position in the photographing-waiting state if the power supply of the camera is turned off. Accordingly, even when the waterproof camera casing is attached to the camera, the photographer will not miss a shutter chance owing to the automatic control, and consumption of the cell for the camera can be reduced.

According to the waterproof camera casing of the present invention to which the camera according to the present invention can be detachably housed, the lens barrel state can be selected by the manipulation from the outer side of the waterproof casing. Consequently, even if the camera according to the present invention is fitted into the waterproof camera casing, the effects of the camera according to the present invention can be utilized by selecting the lens barrel state.

Further, according to the waterproof camera casing which comprises the waterproof camera casing detector configured to make the waterproof camera casing attachment detector of the camera detect that the waterproof camera casing is attached to the camera and the controller being configured to control the camera such that in case that the detector detects that the camera casing is attached to the camera, the lens barrel is kept at the position in the photographing-waiting state when the power supply of the camera is turned off, the camera is detachably housed in the waterproof camera casing, and the waterproof casing attachment detector can be made to automatically detect that the waterproof camera casing is attached to the camera when the camera is housed in the casing. By so constructing the camera, when the power supply of the camera is turned off, the lens barrel can be maintained at the position in the photographing-waiting state. Thus, even when the waterproof camera casing is fitted to the camera, the effects of the above camera can be utilized.

BRIEF DESCRIPTION OF THE DRAWINGS

For a better understanding of the invention, reference is made to the attached drawings, wherein.

DESCRIPTION OF THE PREFERRED
EMBODIMENTS OF THE PRESENT
INVENTION

In the following description, the most preferable embodiments of the present invention will be explained in greater detail with reference to the attached drawings in the order of the first to third embodiments.

First Embodiment

Figure 1:
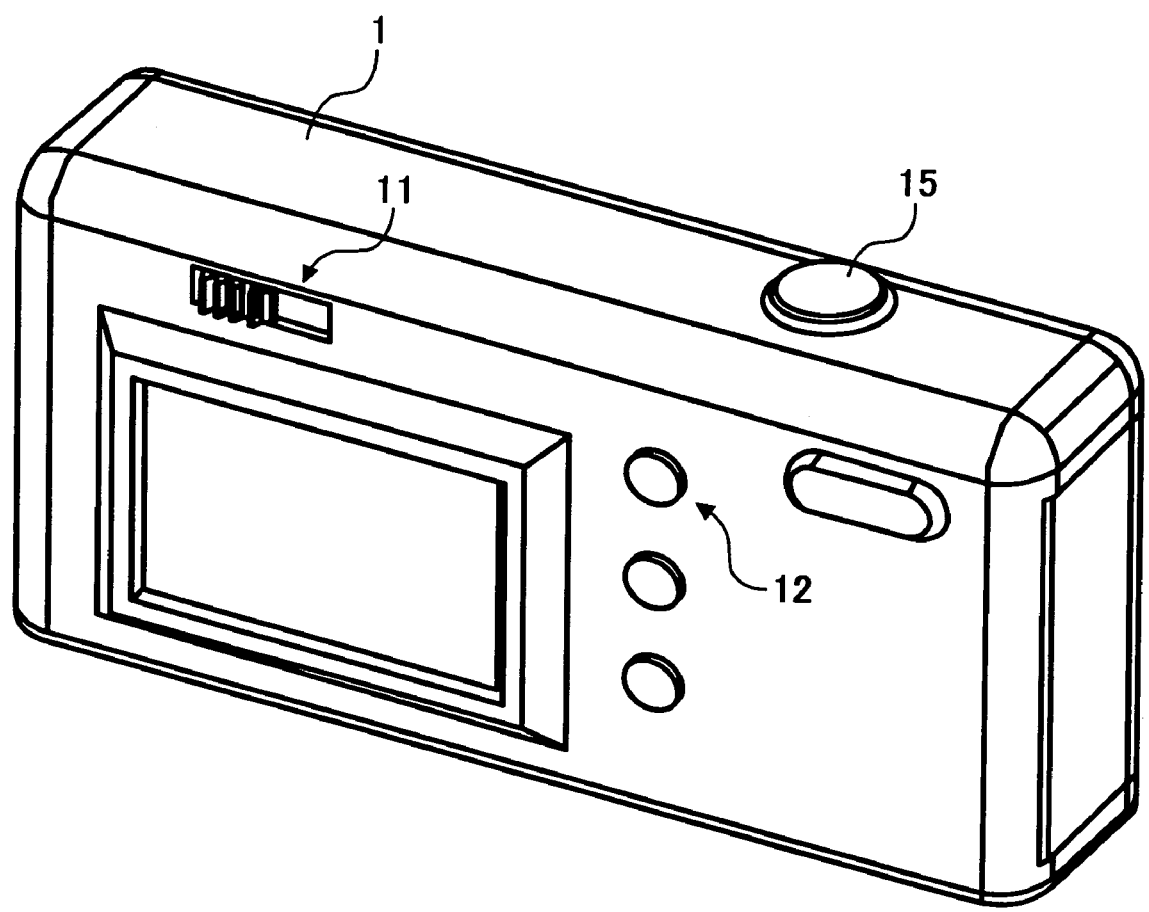
FIG. 1 is a perspective view showing an outer construction according to a first embodiment of the camera of the present invention as viewed from a side of a rear face thereof.

FIG. 1 is a perspective view of a front-face construction of a camera according to the first embodiment of the present invention. In FIG. 1, the camera of this embodiment comprises a camera body 1, and a lens barrel state-selecting switch 11 (a lens barrel state selector) and a power supply button 12 both arranged on the camera body. The power supply button 12 is a switch to turn on/off the power supply of the camera body 1.

In this first embodiment, the lens barrel state-selecting switch 11 is a slide-type switch. Alternatively, the switch 11 may be a toggle switch or a switch of such a type as alternatively repeating two kinds of selections every pushing, for example.

A shutter release button 15 is arranged at an upper face of the camera body 1. In first pushing down the button, operations such as photometric measurement, distance measurement and focusing are started. In a second pushing down of the button, an aperture of the shutter begins to be opened.

In this embodiment, the lens barrel state-selecting switch 11 and the power supply button 12 are arranged at the rear face of the camera body, but they may be arranged at arbitrary positions of the camera body, respectively.

Although various instruments and switches other than the lens barrel state-selecting switch 11 and the power supply button 12 are arranged at the camera body 1, an illustration and a description thereof are omitted.

Figure 2A:
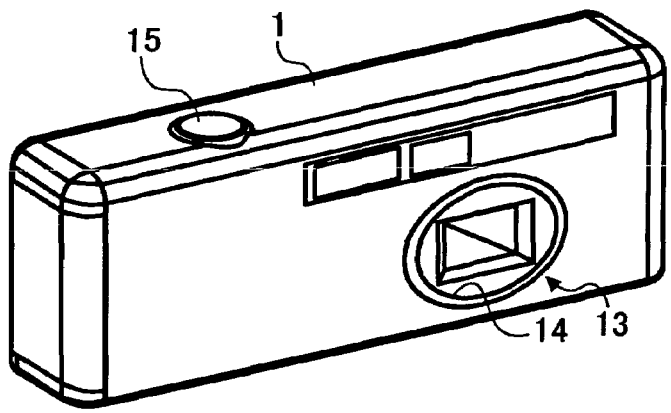
FIG. 2A is a perspective view of the outer construction of the camera in FIG. 1, as viewed from a side of a front face thereof, in the state wherein the lens barrel is housed into the camera body.

FIG. 2A is a perspective view of an outline view of a front face of the camera according to the first embodiment of the present invention, showing a state in which a lens barrel 14 is completely housed in a lens barrel-housing portion 13.

Figure 2B:
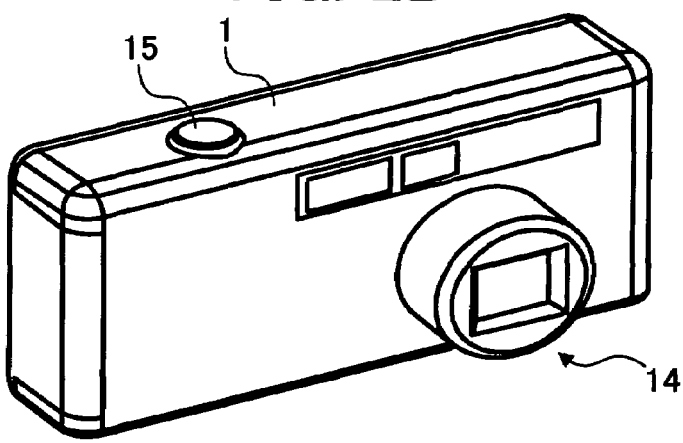
FIG. 2B is a perspective view of the outer construction of the camera of FIG. 1, as viewed from a side of a front face thereof, in the state wherein the lens barrel is projected.
Figure 2C:
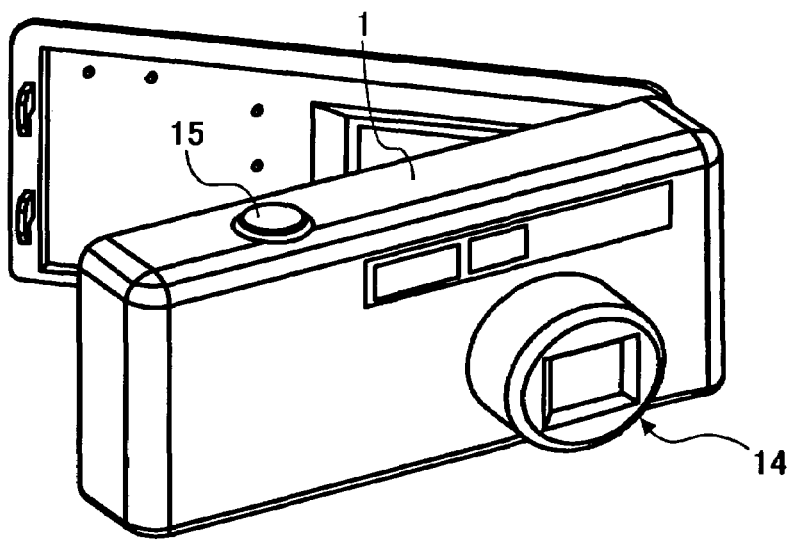
FIG. 2C is a perspective view showing the camera shown in FIG. 2B in the state wherein a rear lid of the camera is opened.

FIG. 2B shows a photograph-waiting state in which the lens barrel 14 is completely projected from the lens barrel-housing portion 13. FIG. 2C shows a state in which a rear lid of the camera is opened.

In the following discussion, the function of each of the constituting elements of the camera according to this embodiment will be explained.

The electric power button 12 shown in FIG. 1 functions to turn on or off the power supply to be supplied to the camera body 1.

The lens barrel state-selecting switch 11 determines whether the lens barrel is driven or not in the state that the power supply button 12 of the camera body 1 is switched on. That is, when a "waiting time for power supply being OFF" is preliminarily selected by the lens barrel state-selecting switch 11, even if the power supply button 12 is switched from "switch-on state" to "switch-off state", the lens barrel 14 is kept projected (extended outwardly) (that is, in a waiting state, i.e., the position in the photographing-waiting state is maintained) and the power supply of the camera body 1 is turned off (i.e., this state is shown in FIG. 2B).

In this photographing-waiting state, when the power supply button 12 is then turned from the switch-off state to the switch-on state again, the lens barrel 14 is shifted from the waiting state to the actually photographing-waiting state.

If a "housed state at time of power supply being OFF" is preliminarily selected by the lens barrel state-selecting switch 11, the lens barrel 14 is housed within the lens barrel-housing portion 14 (that is, from the photographing-waiting state to the housed state) and the power supply of the camera body 1 is turned off (this state is shown in FIG. 2B), even when the power supply button 12 is switched from a "switch-on state" to a "switch-off state".

In this housed state of the lens barrel 14, when the power supply button 12 is then turned from the switch-off state to the switch-on state, the lens barrel 14 is shifted from the housed state to the photographing-waiting state. In either case, when the shutter release button 15 is pushed down to the first step and the second step in the state that the electric power button 12 is switched on, exposure is effected with appropriate exposure level under a matched focus through operation of an exposure control mechanism, a focus-adjusting mechanism, etc. not shown.

All the above controls are performed by a microcomputer not shown inside the camera body.

The camera further comprises a lens barrel driving unit being configured for driving the lens barrel from the position in the photographing-waiting state to the housed state upon receipt of an order signal from the controller when the power supply of the camera is turned off in the state that said lens barrel state selector is selecting setting the lens barrel in the housed state, whereas the lens barrel driving unit drives the lens barrel from the housed state to the position in the photographing-waiting state upon receipt of an order signal from the controller when the power supply of the camera is turned on in the state that said lens barrel state selector is selecting setting the lens barrel in the housed state.

The "lens barrel driving unit for driving the lens barrel from the housed state to the photographing-waiting state or vice versa upon receipt of an order signal from the controller when the power supply of the camera is turned off or on" is well known in the art, detailed description thereof is omitted.

Since the "lens barrel driving unit for driving the tens barrel from the housed state to the photographing-waiting state or vice versa upon receipt of an order signal from the controller when the power supply of the camera is turned off or on, respectively," is well known in the art, explanation thereof is omitted. Such a lens barrel driving unit is disclosed in U.S. Pat. No. 5,956,187, for example. The disclosure in U.S. Pat. No. 5,956,187 is incorporated herein by reference.

Figure 3:
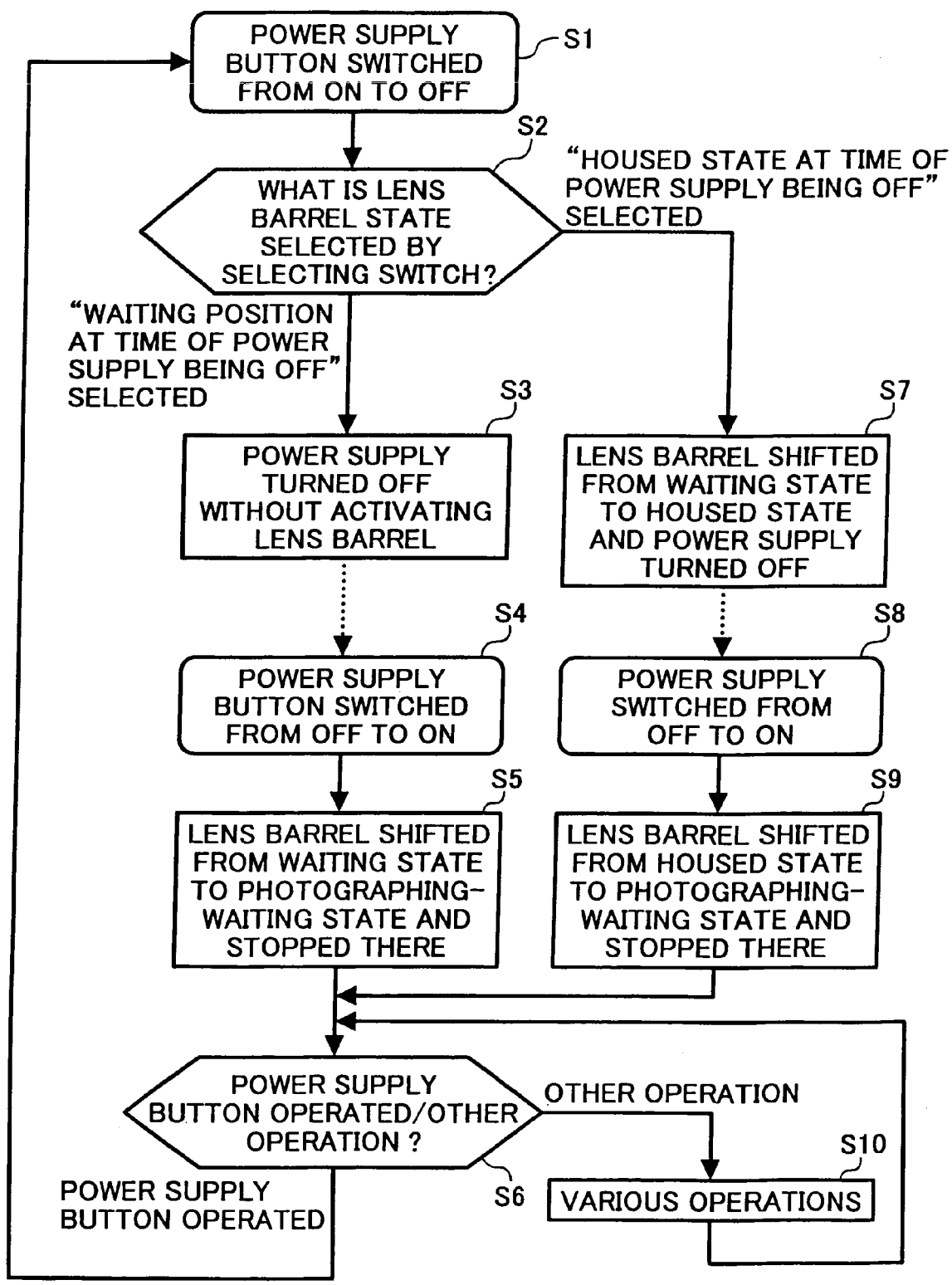
FIG. 3 is a flow chart showing operations of the first embodiment of the camera according to the present invention.

FIG. 3 is a flow chart showing the operation of the first embodiment of the camera according to the present invention. In the following discussion, the operation of the camera of this embodiment will be explained by using the flow chart in FIG. 3 with reference to FIGS. 1 and 2. As mentioned above, all steps are performed by the microcomputer not shown inside the camera body 1.

First, a photographer switches a power supply button 12 from a switch-on state to a switch-off state (Step S1).

Following this, it is checked as to what is the lens barrel state preliminarily selected by the lens barrel state selecting switch 11 (Step S2). When the lens barrel state-selecting switch 11 preliminarily selects "photographing-waiting state at time of power supply being OFF", proceed to Step S3. If the switch 11 preliminarily selects "housed state at time of power supply being OFF", proceed to Step S7.

In Step S3, the power supply is turned off, while the lens barrel 14 is not moved. Next, the photographer switches the power supply button 12 from the switch-off state to the switch-on state (Step S4). By this step, the lens barrel 14 is moved from the waiting state to and is stopped at the photographing-waiting state (Step S5).

As cases are divided in Step S6, succeeding processing is divided into a case where the photographer operates the power supply button and a case where the photographer performs other operation. If the photographer operates the power supply button, the process begins from Step 1 again.

If the or she performs other operation, for example, photographing operation, the shutter release button 15 is pushed down as mentioned above, a series of operations such as light measurement, distance measurement, focusing and shutter opening/closing are performed (Step S10), and the process is returned to Step 6. In Step 3, the lens barrel state selecting switch 11 selects the "housed state at time of power supply being OFF", branch into Step 7.

In Step 7, the lens barrel 14 is shifted from the photographing-waiting state to the housed state, and then the power supply of the camera is turned off.

Next, when the photographer switches the power supply button 12 from the switch-off state to the switch-on state (Step S8), the lens barrel 14 is shifted from the housed state to and stopped at the photographing-waiting state (Step S9). The succeeding process is the same as classified depending upon the cases in Step S6.

Second Embodiment

Figure 4:
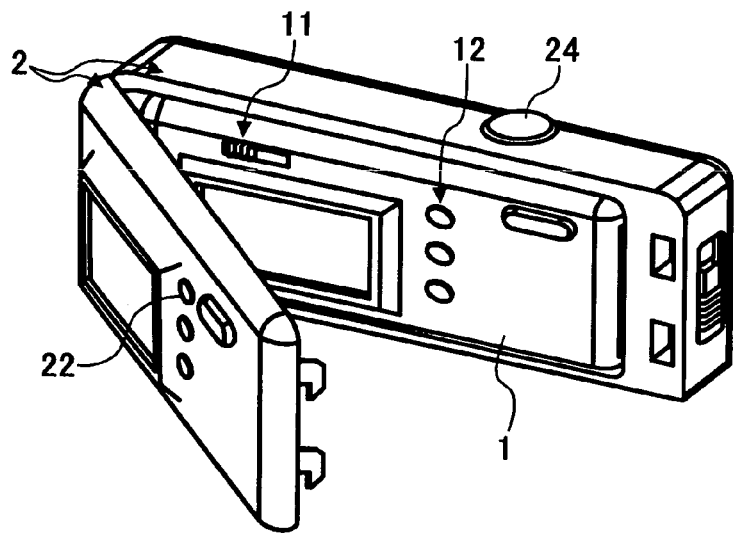
FIG. 4 is a perspective view showing a second embodiment of the camera according to the present invention in the state that the camera is housed in a waterproof camera casing and a rear lid of the camera casing is opened.
Figure 5:
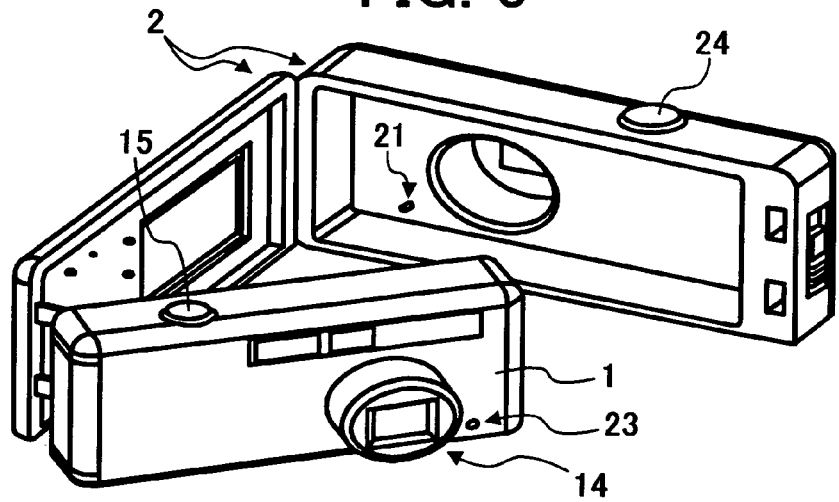
FIG. 5 is a perspective view of the outer constructions of the camera and the waterproof camera casing according to the second embodiment of the present invention.
Figure 6:
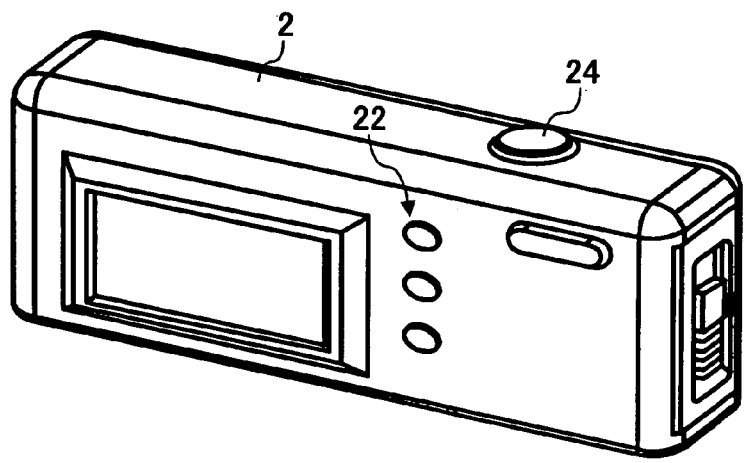
FIG. 6 is a perspective view showing the construction of the camera according to the second embodiment of the present invention as housed in the waterproof camera casing.

FIGS. 4, 5 and 6 are perspective views showing outer constructions of a camera and a waterproof camera casing according to a second embodiment of the present invention.

FIG. 4 is a perspective view showing a second embodiment according to the present invention, as viewed from a side of a rear face of the camera casing. In order to clarify the state that the camera is housed in the waterproof casing, FIG. 4 shows a state in which a rear lid of the camera casing is opened. FIG. 5 is a perspective view showing a front face construction of the camera and the waterproof camera casing before the camera is housed thereinto. FIG. 6 shows the outer construction of the waterproof casing in which the camera is housed.

As shown in FIGS. 4, 5 and 6, the camera of the second embodiment can be housed into the waterproof camera casing in the second embodiment.

The camera of this embodiment is the same as that of the first embodiment except that the former is additionally provided with a detector for detecting if the waterproof casing 2 is attached. Therefore, the camera according to the second embodiment is the same as that in the first one except for this difference.

As shown in FIG. 5, the waterproof casing 2 is provided with a projection 21 for enabling detection of the attachment of the waterproof casing to the camera. On the other hand, the camera body 1 is provided with a button 23 for detecting the attachment of the waterproof casing thereto at a front face locally corresponding to the waterproof casing attachment detection-enabling projection 21 arranged on the waterproof casing 2.

Further, a power supply button 22 (on a side of the waterproof casing) is provided on a side of the waterproof casing 2 at a location corresponding to the power supply button 12 (FIG. 4) of the camera body 1 so that the power supply button 12 may be manipulated.

Furthermore, a shutter release button 24 (on the side of the waterproof casing) is arranged on the waterproof casing 2 at a location corresponding to the shutter release button 15 of the camera body 1. The waterproof casing of the second embodiment is not provided with a switch for selectively manipulating the lens barrel state selecting switch 11 as provided on the side of the camera body 1.

In this embodiment, as shown in FIG. 5, the attachment detector is constituted by the button 23 provided, on the front face of the camera body 1, for detecting the attachment of the waterproof casing to the camera. Other detectors may be generally used.

In the following discussion, the function of the various constituting elements of the camera according to this embodiment will be explained.

If no waterproof casing is attached to the camera (in other words, if the camera is not housed in the waterproof casing 2), the operation of the camera is the same as that of the camera according to the first embodiment.

Next, the situation where the waterproof casing 2 is attached to the camera will be explained.

After the camera body 1 is fitted in the waterproof casing 2 in the state that a lid of the waterproof casing 2 is opened, the lid of the waterproof casing 2 is closed to house the waterproof casing 2 into the camera body 1. In other words, the camera body 1 is contained in the waterproof casing 2.

When the waterproof casing 2 is attached to the camera body 1, the waterproof casing attachment-detecting projection 21 arranged on the waterproof casing 2 pushes and moves the waterproof casing attachment-detecting button 23 on the front face of the camera body 1. This enables the computer built in the camera body 1 to detect that the waterproof casing 2 is attached to the camera.

When the power supply button 12 is switched from the switch-on state to the switch-off state by the power supply button 22 on the side of the waterproof casing 2, the power supply of the camera 1 is turned off, whereas the lens barrel 14 is kept projected (that is, kept in a photographing-waiting state).

Then, when the power supply button 12 is switched again from the switch-off state to the switch-on state through the power supply button 22 in this photographing-waiting state, the lens barrel 14 is shifted from the waiting state to the actual photographing-waiting state.

When a photographer merely pushes the shutter release button 24 after he or she dives under water and directs the camera in this state toward a subject to be photographed, underwater photographing can be made. After the photographing, if the power supply button 22 is turned off, the power supply is stopped in the state that the lens barrel 14 is stopped at the photograph-waiting position.

Figure 7:
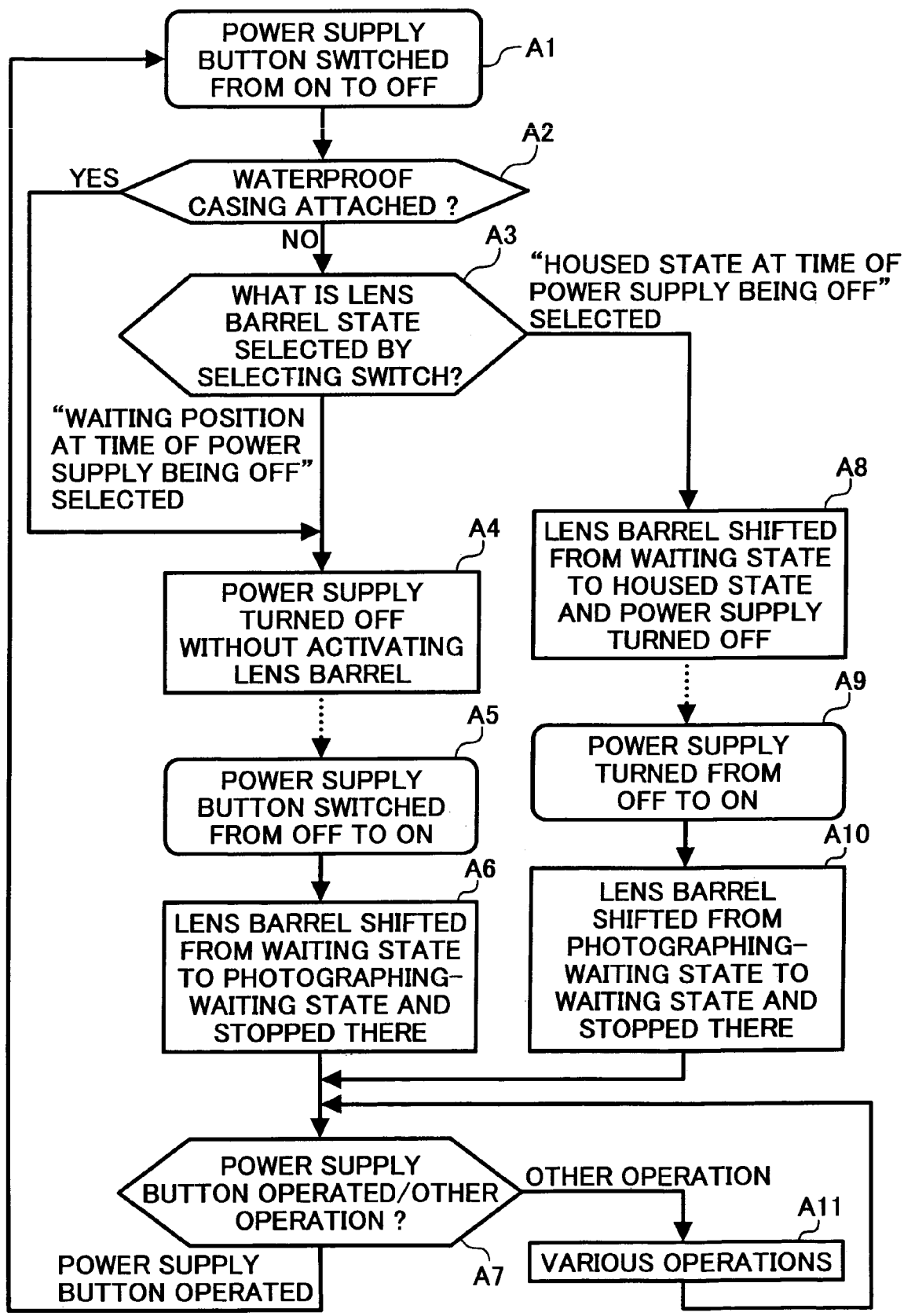
FIG. 7 is a flow chart showing operations of the camera according to the second embodiment of the present invention.

FIG. 7 is a flow chart showing operations of the camera according to the second embodiment of the present invention.

In the following discussion, the operations of the camera of this embodiment will be explained by using the flow chart in FIG. 7 with reference to FIGS. 4, 5 and 6.

First, the photographer switches the power supply button 12 from the switch-on state to the switch-off state (Step A1).

Following this, a check is made whether the waterproof casing 2 is attached or not (that is, whether the waterproof casing attachment-detecting button 23 is pushed down or not). If the waterproof casing 2 is attached, the process jumps to Step A4. If the waterproof casing 2 is not attached, the process proceeds to Step A3.

Following this, a check is made in Step A3 as to the state of the lens barrel preliminarily selected by the lens barrel state-selecting switch 11. If the "waiting state at time of power supply being OFF" is preliminarily selected by the lens barrel state-selecting switch 11, proceed to Step A4. On the other hand, if the "housed state at time of power supply being OFF" is preliminarily selected by the lens barrel state-selecting switch 11, proceed to Step A8.

In Step A4, the power supply is turned off without activating the lens barrel 14.

Next, the photographer turns the power supply button 12 from the switch-off state to the switch-on state (Step A5).

Thereby, the lens barrel 14 is shifted from the waiting state to the actually photographing-waiting state and is stopped there (Step A6).

As cases are divided in Step A7, the succeeding step is divided into a case where the photographer operates the power supply button and a case where the photographer performs other operation. When the photographer operates the power supply button, the process begins at Step A1 again. Further, when the photographer carries out other operation, for example, he or she performs photographing operation, a given operation is repeated until such operations are terminated (Step A11).

In Step 8, the lens barrel 14 is shifted from the waiting state to the housed state, and the power supply of the camera body 1 is turned off.

Then, the photographer switches the power supply button from the switch-off state to the switch-on state (Step A9).

This shifts the lens barrel 14 from the housed state to the photographing-waiting state and stops it there (Step A10).

The succeeding process is the same as explained depending upon cases divided in Step A7.

Third Embodiment

Figure 8:
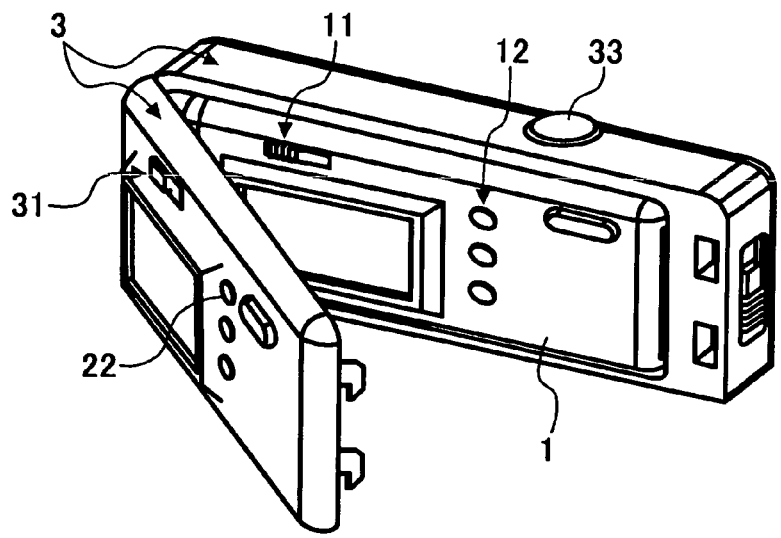
FIG. 8 is a perspective view of a third embodiment of a camera according to the present invention in the state that the camera is fitted into a waterproof casing before a rear lid of the waterproof casing is closed.
Figure 9:
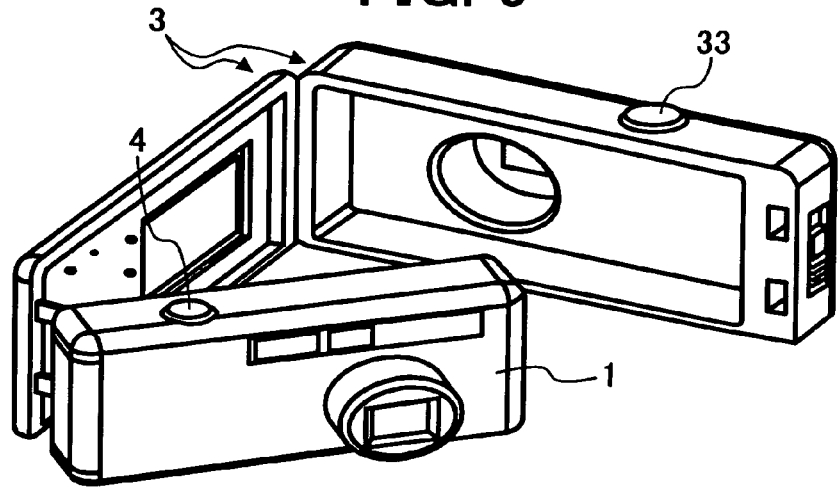
FIG. 9 is a perspective view showing the camera according to the third embodiment of the present invention before the camera is fitted into the waterproof casing.
Figure 10:
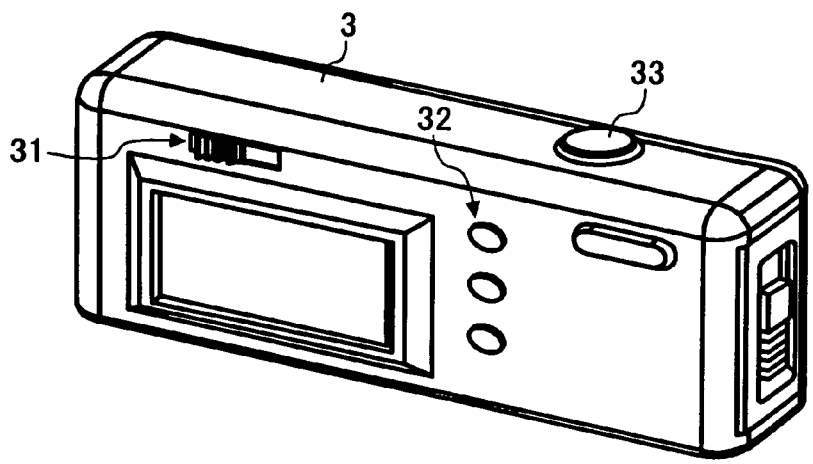
FIG. 10 is a perspective view showing the camera according to the third embodiment of the present invention in the state that the camera is housed in the waterproof camera casing.

FIGS. 8, 9 and 10 are perspective views for illustrating outer constructions of a camera and a waterproof casing according to a third embodiment of the present invention.

Among these figures, FIG. 8 illustrates the camera body 1 in the state wherein a rear lid of the waterproof casing 3 is opened to show that the camera body 1 is fitted into the waterproof casing 3. FIG. 9 shows the camera body 1 and the waterproof casing 3 before the former is fitted into the latter. FIG. 10 shows the state that the camera body 1 is fitted into the waterproof casing 3.

The camera shown in FIGS. 8, 9 and 10 differs from that according to the second embodiment in that no waterproof casing detector is attached. That is, the waterproof casing attachment-detecting button 23 is not additionally provided in the camera body 1 of this third embodiment unlike the camera shown in the second embodiment. Except for this, the camera according to the third embodiment has the same construction and the operation as in the case with that according to the second embodiment.

The waterproof camera casing in the third embodiment is a waterproof camera casing corresponding to the camera having no waterproof casing attachment detector, and the waterproof casing 3 is not provided with the waterproof casing attachment-detecting projection 12, unlike the second embodiment.

Instead, as shown in FIG. 8, the waterproof casing 3 is provided with a lens barrel state-selecting switch 31 on a side of the waterproof casing. The switch 31 is made waterproof and is located at such a position that a lens barrel state-selecting switch 11 on a side of the camera body 1 can be operated from an outer side of the waterproof casing 31.

That is, according to the camera body 1 and the waterproof casing 3 of the third embodiment, the lens barrel state-selecting switch 11, the power supply button 2 and the shutter release button 15 of the camera body 1 can be operated from the outer side of the waterproof casing 3 through at least the lens barrel sate-selecting switch 31, the power supply button 32 and the shutter release button 33.

Therefore, the characteristics of the camera according to the present invention can be fully exhibited even in the state that the camera body 1 is housed in the waterproof casing 3.

What is claimed is:

1. A camera comprising:

an outer cover;

a lens barrel provided such that when the barrel is in a housed state, the lens barrel is housed inside the outer cover in the state wherein a front face of the lens barrel is substantially flush with a front face portion of the outer cover surrounding the front face of the lens barrel, whereas when the lens barrel is in a photographing-waiting state in which photographing is possible, the front face of the lens barrel is projected from said surrounding front face portion of the outer cover;

a lens barrel state selector for selecting either one of setting the lens barrel in the housed state and keeping the lens barrel at a position in the photographing-waiting state, when a power supply of the camera is turned off;

a waterproof camera casing detector configured to detect if a waterproof camera casing is attached to the camera; and a controller configured for controlling the camera such that the lens barrel is set in the housed state when the power supply of the camera is turned off in the state that the lens barrel state selector is selecting setting the lens barrel in the housed state, whereas the lens barrel is kept at the position in the photographing-waiting state when the power supply of the camera is turned off in the state that the selector is selecting keeping the lens barrel at the position in the photograph-waiting state, the controller being also configured for controlling the camera such that the lens barrel is kept at the position in the photographing-waiting state when the power supply of the camera is turned off in a case where the detector detects that the camera casing is attached to the camera.

2. The camera of claim 1, which further comprises a lens barrel driving unit being configured for driving the lens barrel from the position in the photographing-waiting state to the housed state upon receipt of an order signal from the controller when the power supply of the camera is turned off in the state wherein said lens barrel state selector is selecting setting the lens barrel in the housed state, whereas the lens barrel driving unit drives the lens barrel from the housed state to the position in the photographing-waiting state upon receipt of an order signal from the controller when the power supply of the camera is turned on in the state that said lens barrel state selector is selecting setting the lens barrel in the housed state.

3. A waterproof camera casing configured to detachably house the camera set forth in claim 2, which camera casing comprises a waterproof case selector configured to perform said selection of the lens barrel state selector by operation from an outer side of the waterproof camera casing.

4. A waterproof camera casing configured to detachably house the camera set forth in claim 1, which camera casing comprises a waterproof case selector configured to perform said selection of the lens barrel state selector by operation from an outer side of the waterproof camera casing.

5. A waterproof camera casing configured to detachably house the camera set forth in claim 1, which camera casing comprises a waterproof case selector configured to perform said selection of the lens barrel state selector by operation from an outer side of the waterproof camera casing.

6. A waterproof camera casing configured to detachably house the camera set forth in claim 1, which casing comprises an interactive portion configured to make said waterproof camera casing detector detect that the camera casing is attached to the camera when the camera is housed in the camera casing.

7. A camera comprising:

an outer cover;

a lens barrel provided such that when the barrel is in a housed state, the lens barrel is housed inside the outer cover in the state that a front face of the lens barrel is substantially flush with a front face portion of the outer cover surrounding the front face of the lens barrel, whereas when the lens barrel is in a photographing-waiting state in which photographing is possible, the front face of the lens barrel is projected from said surrounding front face portion of the outer cover;

a waterproof camera casing detector configured to detect if a waterproof camera casing is attached to the camera; and a controller configured to control the camera such that when the detector detects that the camera casing is attached to the camera and the power supply of the camera is turned off, the lens barrel is kept at the position in the photographing-waiting state.

8. A waterproof camera casing configured to detachably house the camera set forth in claim 7, which casing comprises an interactive portion configured to make said waterproof camera casing detect that the camera casing is attached to the camera when the camera is housed in the camera casing.

* * * * *